(12) United States Patent
Gilmore et al.

(10) Patent No.: US 11,012,466 B2
(45) Date of Patent: May 18, 2021

(54) COMPUTERIZED SYSTEM AND METHOD FOR PROVIDING CYBERSECURITY DETECTION AND RESPONSE FUNCTIONALITY

(71) Applicant: IndraSoft, Inc., Reston, VA (US)

(72) Inventors: Tom Gilmore, Ashburn, VA (US);
Priscila Santos, McLean, VA (US);
Neiland Wright, Vienna, VA (US)

(73) Assignee: IndraSoft, Inc., Reston, VA (US)

( * ) Notice: Subject to any disclaimer, the term of this patent is extended or adjusted under 35 U.S.C. 154(b) by 0 days.

(21) Appl. No.: 15/647,860

(22) Filed: Jul. 12, 2017

(65) Prior Publication Data

US 2018/0020021 A1 Jan. 18, 2018

Related U.S. Application Data

(60) Provisional application No. 62/361,890, filed on Jul. 13, 2016.

(51) Int. Cl.
*G06F 11/00* (2006.01)
*H04L 29/06* (2006.01)
(Continued)

(52) U.S. Cl.
CPC ...... *H04L 63/1441* (2013.01); *H04L 63/1408* (2013.01); *G06Q 10/06* (2013.01);
(Continued)

(58) Field of Classification Search
CPC combination set(s) only.
See application file for complete search history.

(56) References Cited

U.S. PATENT DOCUMENTS 6,223,143 B1    4/2001  Weinstock et al.
6,980,927 B2 *  12/2005 Tracy ............... G06F 21/577
                                                702/181

(Continued)

OTHER PUBLICATIONS

Caprioth et al., "A new disease-specific machine learning approach for the prediction of cancer-causing missense variants," Genomics, vol. 98, pp. 310-317 (2011).

(Continued)

*Primary Examiner* — Charles Ehne
(74) *Attorney, Agent, or Firm* — Greenberg Traurig, LLP

(57) ABSTRACT

Disclosed are systems and methods for improving interactions with and between computers in a search system supported by or configured with search servers, applications or platforms. The systems interact to identify and retrieve data across platforms, which data can be used to improve the quality of results data used in processing interactions between or among processors in such systems. The disclosed systems and methods provide an incident management and response software (IMRS) system that accelerates security incident detection and response. The IMRS provides an adaptive, event-driven workflow automation platform that can be customized to suit a large range of infrastructure environments and asset classes. The IMRS encompasses the management, automation and orchestration technologies applied in the detection and remediation of a computer network security incident (e.g., malware, advanced persistent threat, insider crime, denial of service attack, and the like).

20 Claims, 10 Drawing Sheets

(51) Int. Cl.
*G06Q 10/06* (2012.01)
*G06Q 10/10* (2012.01)

(52) U.S. Cl.
CPC ............ *G06Q 10/10* (2013.01); *H04L 63/145* (2013.01); *H04L 63/1458* (2013.01); *H04L 63/1491* (2013.01)

(56) References Cited

U.S. PATENT DOCUMENTS

| | | |
|---|---|---|
| 7,096,498 B2 | 8/2006 | Judge |
| 8,150,783 B2 | 4/2012 | Gonsalves et al. |
| 8,302,198 B2* | 10/2012 | Deraison ............... G06F 21/577 726/25 |
| 9,043,894 B1 | 5/2015 | Dennison et al. |
| 9,165,250 B2 | 10/2015 | Froelich |
| 9,177,156 B1* | 11/2015 | Kaplan ............... H04L 63/1433 |
| 9,335,911 B1 | 5/2016 | Elliot et al. |
| 2006/0149604 A1 | 7/2006 | Miller |
| 2007/0103294 A1 | 5/2007 | Bonecutter et al. |
| 2011/0264608 A1 | 10/2011 | Gonsalves et al. |
| 2012/0036580 A1* | 2/2012 | Gorny ................. H01L 63/1433 726/25 |
| 2015/0040229 A1* | 2/2015 | Chan ..................... G06F 21/577 726/25 |
| 2016/0342796 A1* | 11/2016 | Kaplan ............... H04L 63/1433 |

OTHER PUBLICATIONS

Cichonski et al., "Computer Security Incident Handling Guide, Recommendations of the National Institute of Standards and Technology," Special Publication 800-61, Revision 2, National Institute of Standards and Technology, 79 pages (2012).
Herzog et al., "Open Source Security Testing Methodology Manual (OSSTMM)," http://www.isecom.org/research, 92 pages (2016).
ISA/US International Preliminary Report, Search Report and Written Opinion issued on PCT/US2017/041914, dated Sep. 22, 2017, 28 pgs.

* cited by examiner

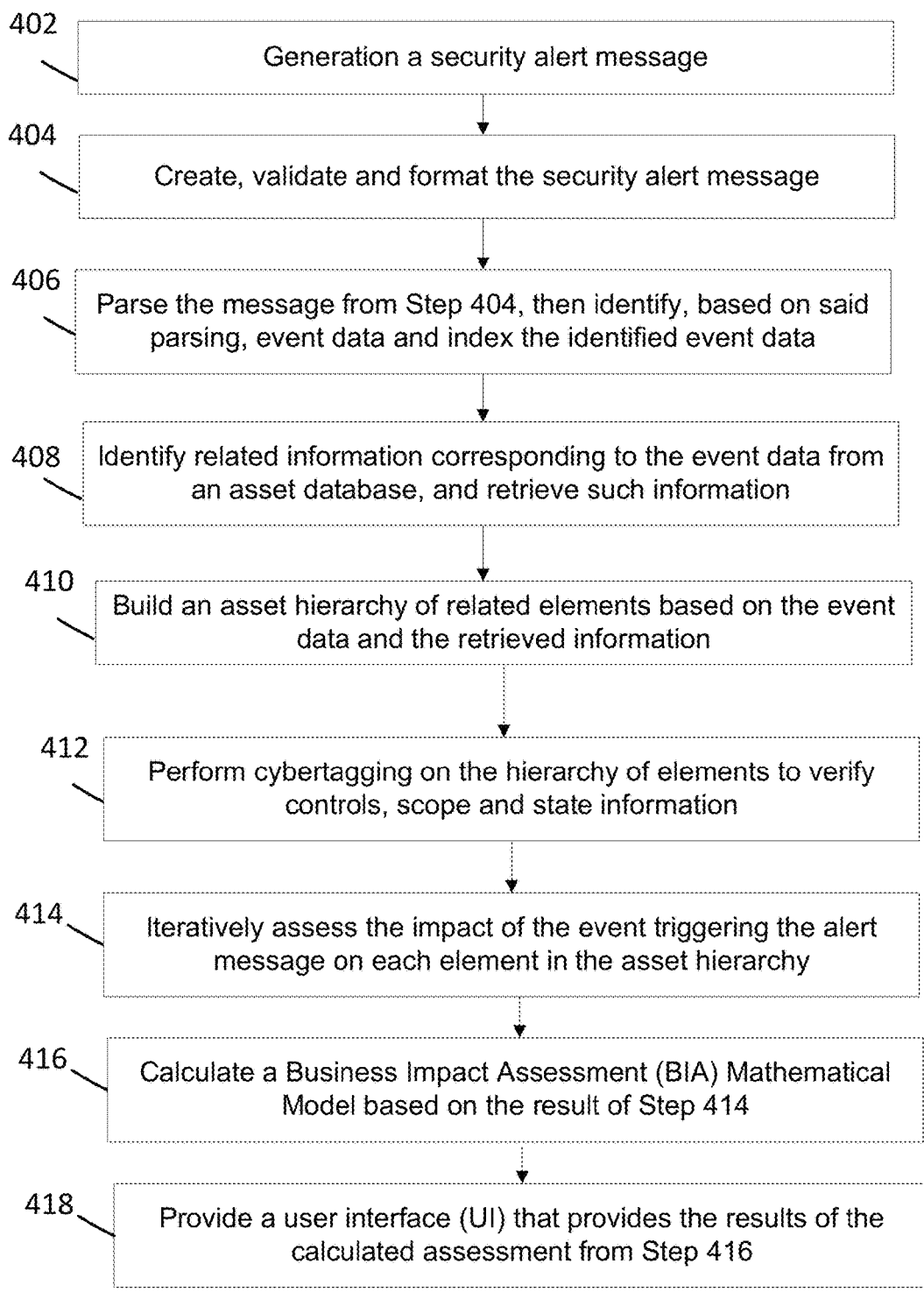

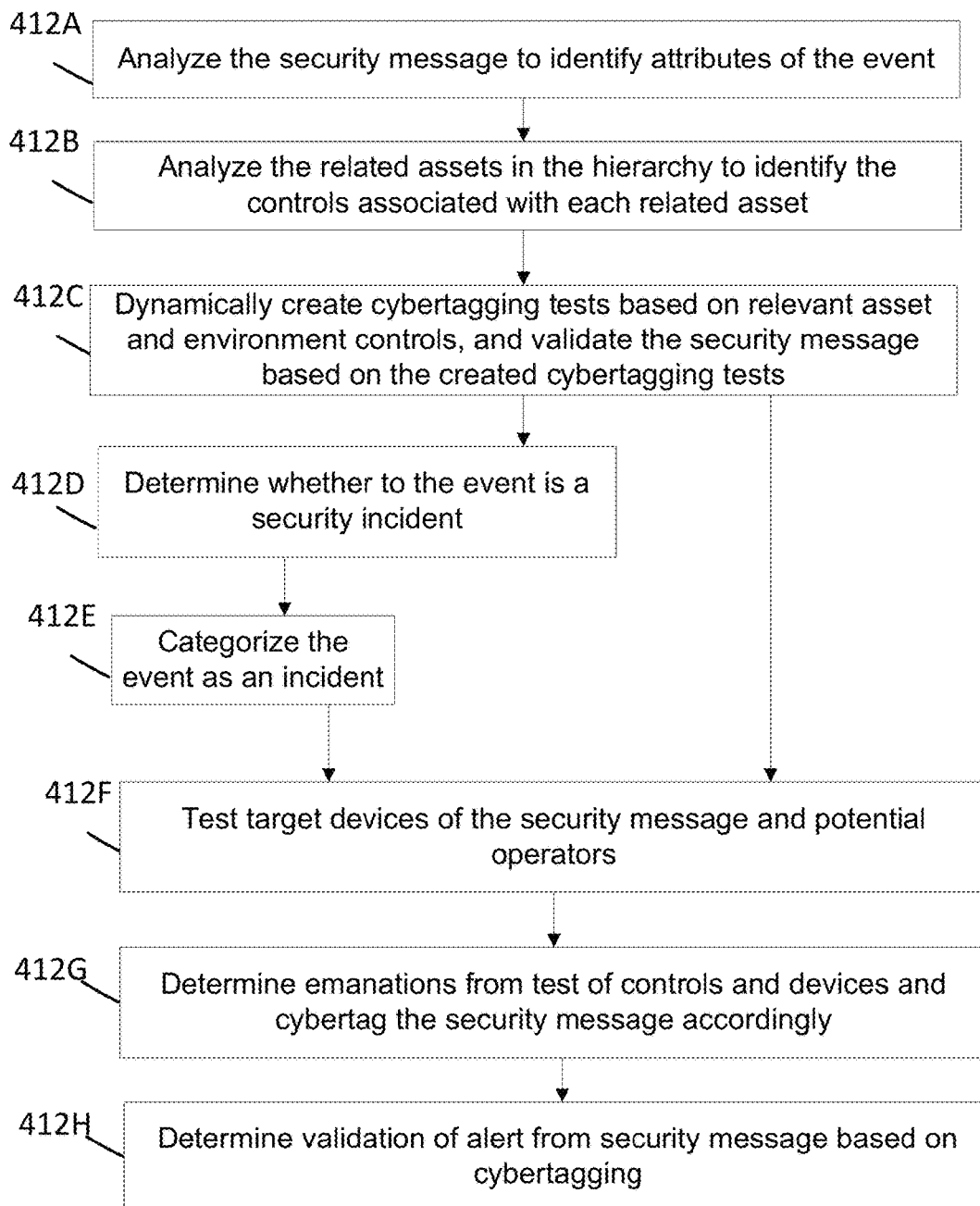

416

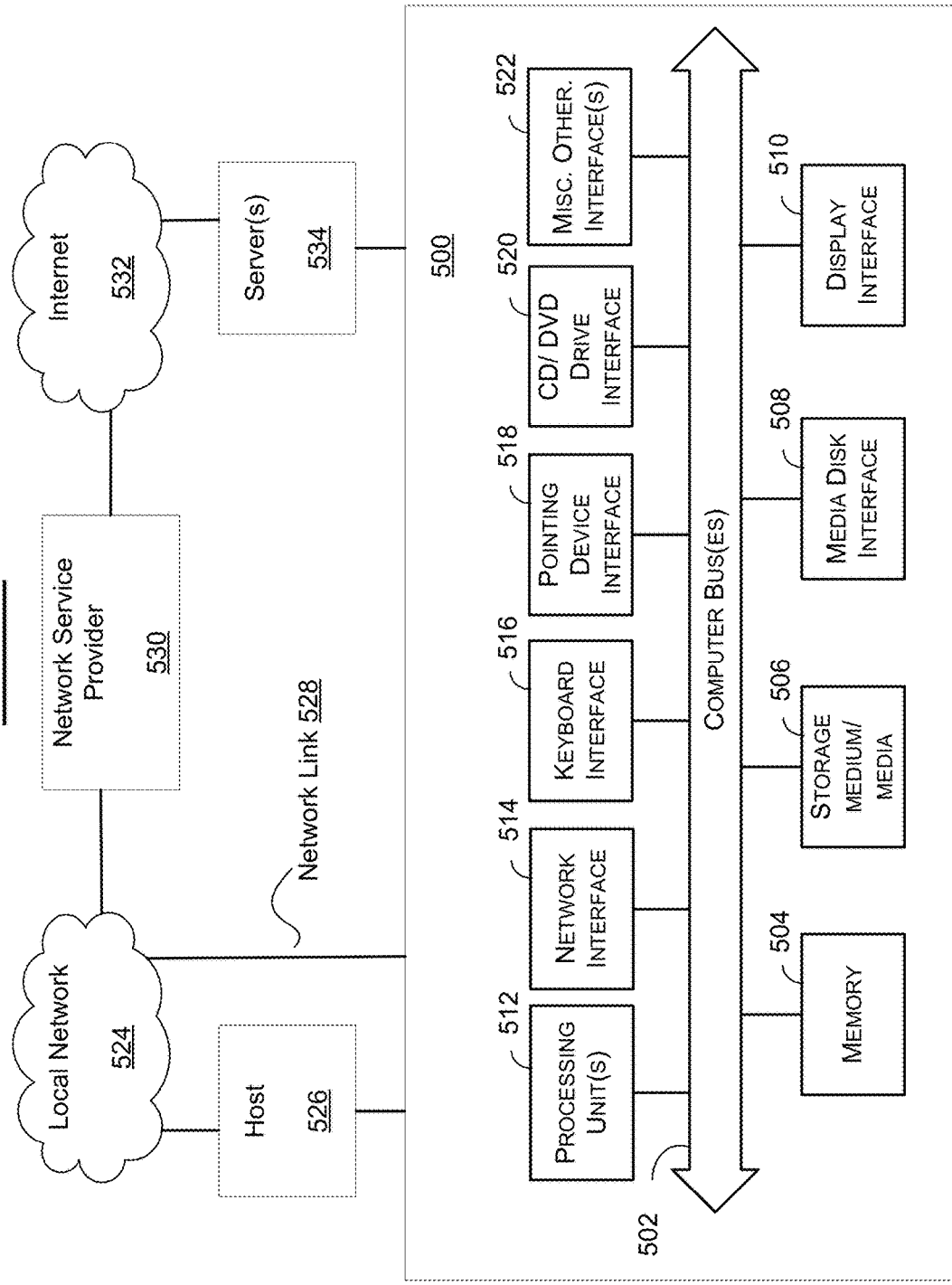

COMPUTERIZED SYSTEM AND METHOD FOR PROVIDING CYBERSECURITY DETECTION AND RESPONSE FUNCTIONALITY

CROSS-REFERENCE TO RELATED APPLICATIONS

The instant application claims priority from U.S. Provisional Patent Application No. 62/361,890, filed on Jul. 13, 2016, entitled "Incident Management And Response System (IMRS)," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of computerized systems, applications and/or platforms by modifying the capabilities of such systems, applications and/or platforms to provide automatic cybersecurity event detection and response functionality based on the aspects of the detected security event.

SUMMARY

According to embodiments of the instant disclosure, the disclosed systems and methods provide a novel framework that provides an improved incident management and response system (IMRS). As discussed in more detail below, the IMRS encompasses the management, automation and orchestration technologies applied in the detection and remediation of a computer network security incident (e.g., malware, advanced persistent threat, insider crime, denial of service attack, and the like). According to embodiments of the instant disclosure, an integrated, networked application is disclosed that provides security incident response functionality to the computer(s) or network(s) hosting IMRS. In some embodiments, the IMRS may be embodied as an application (e.g., locally installed, or web-based application), a service or a networked platform, as discussed in more detail below.

According to some embodiments of the disclosed systems and methods, the IMRS system can utilize any type of known or to be known enterprise service bus (ESB) integration, workflow state machines, digital cybertagging™ security testing (referred to as "isotope security testing" in the U.S. Provisional App: 62/361,890), quantified risk assessment, ontology-based context models, human-computer collaborative learning, machine learning or artificial intelligence (AI) and collaboration tools, and the like, to assess, relay, respond and share critical incident management information.

By way of background, organizational leaders face an increasing challenge in addressing the risk associated with security and cyber threat convergence, and this not a passing phenomenon. While the disproportionate number of successful cyber security attacks share the common characteristic of targeting human factors as well as vulnerabilities in computer systems, the results are escalating damage to national and economic security. The explosion of business models that harness the choreography of third party services (API ecosystems) and the rise of global, distributed knowledge workers within organizations, necessitate greater scrutiny, stronger partnerships and rigorous adherence to shared security and privacy policies.

Unfortunately, most of the known tools and methodologies currently available deal with only one aspect of a multidimensional need.

In the last few years, a string of high profile cyber security incidents have occurred in a variety of industries, affecting organizations of varying sizes and resulting in the loss of important data, which include, for example: identity information, credit card information, sensitive communications and classified national security information. Cyber security incidents are becoming more prevalent and complex to manage and often result in serious operational, legal and regulatory consequences. Although many organizations have basic security monitoring and malware detection in place, they are unable to respond in a timely, effectively manner to security incidents, for at least the following reasons:

(1) There are an overwhelming large number and variety of alerts generated (most of which are erroneous); (2) there is a recognized shortage of experienced cyber security personnel and security incident management expertise to rapidly detect and respond to security incidents; and (3) practitioners lack an organized, disciplined incident response methodology to speed reaction time, avoid trial-and-error solutions and reduce the amount of time needed to resolve and recover from security incidents.

As such, in order to provide a computerized solution to the clear shortcomings in the field, the instant disclosure provides a novel framework that enables rapid detection and comprehensive response to cyber security incidents using, for example, workflow automation to scrutinize computer security messages while enriching those messages with contextual information that can be shared in real time with other responders supporting the incident. As discussed in more detail below, these and further features and advantages are achieved by implementation of the disclosed IMRS system via the disclosed systems and methods.

According to some embodiments, the disclosed systems and methods provide an incident management and response software system that accelerates security incident detection and response.

In some embodiments, the disclosed systems and methods provide an adaptive, event-driven workflow automation platform that can be customized to suit a large range of infrastructure environments and asset classes.

In some embodiments, the disclosed systems and methods provide a standards-based integration platform that combines messaging, web services, data transformation and intelligent routing to reliably connect and coordinate the interaction of significant numbers of diverse security devices, personnel, applications and threat repositories across extended enterprises.

In some embodiments, the disclosed systems and methods provide a cyber-human learning capacity system based on a crowdsourced risk voting and tabulation engine with digital after action reviews to support the quantification and analysis of security incident risk and business impact through broader situational awareness.

In some embodiments, the disclosed systems and methods provide a digital cybertagging security testing capability based on the Institute for Security and Open Methodologies (ISECOM) Open Source Security Testing Methodology Manual (OSSTMM) model.

In some embodiments, the disclosed systems and methods provide a generic, ontology-based context model for formally describing the activities, assets, events, policies and rules that are elements of the security incident response business process. This ontology enables a flexible representation of relevant technology, personnel and processes while supporting compliance with standards bodies such as International Organization for Standardization (ISO), Information Technology Infrastructure Library (ITIL) and National Institute of Standards and Technology (NIST).

According to some embodiments of the instant disclosure, the IMRS system assesses security events at their origin and automates the process of event review to enrich, categorize prioritize and quantitatively describe events in terms of risk. These embodiments support the National Institute of Standards and Technology Computer Security Incident Handling Guide (SP 800-61) process model and is executed in a platform-agnostic cloud environment, allowing access to the features and functions of the embodiments from a web browser.

According to some embodiments, the features and functions mentioned above and discussed below in detail are fully integrated with each other. More particularly, each of the features are recognized as distinct service endpoints that are coordinated using the platform enterprise service bus (ESB). In this way, these embodiments integrate functional features in a manner supporting extension, customization, substitution and reuse. That is, given the variety of input channels, data formats and the volume of data used to maintain situational awareness for security incident management, this integration pattern is desirable for distributed, asynchronous, parallel processing of streaming data sets to produce visibility and feedback in real time. For example, some embodiments described herein include integration of data from large probability distribution tables that are dynamically generated based on the analysis of events coming from a host of endpoint devices. The decomposition of this data analysis workflow into several ESB services provides a parallelization of resource intensive analytical processing that can be accomplished in real time.

In some embodiments, the IMRS system can include an entire analytics package to perform sensitivity analysis or "what if" scenarios, which can be incorporated in the probability distribution tables to aid in quantifying and prioritizing risks as well as assessing how risks could be mitigated.

In accordance with one or more embodiments, a non-transitory computer-readable storage medium is provided, the computer-readable storage medium tangibly storing thereon, or having tangibly encoded thereon, computer readable instructions that when executed cause at least one processor to provide automatic cybersecurity event detection and response functionality based on the aspects of the detected security event.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4A is a flowchart illustrating steps performed in accordance with some embodiments of the present disclosure;

FIG. 4B illustrates a non-limiting process and data flow associated with the cybertagging testing performed by the IMRS in accordance with some embodiments of the present disclosure;

FIG. 5 is a block diagram illustrating architecture of a hardware device in accordance with one or more embodiments of the present disclosure.

DETAILED DESCRIPTION OF EMBODIMENTS

Figure 1:
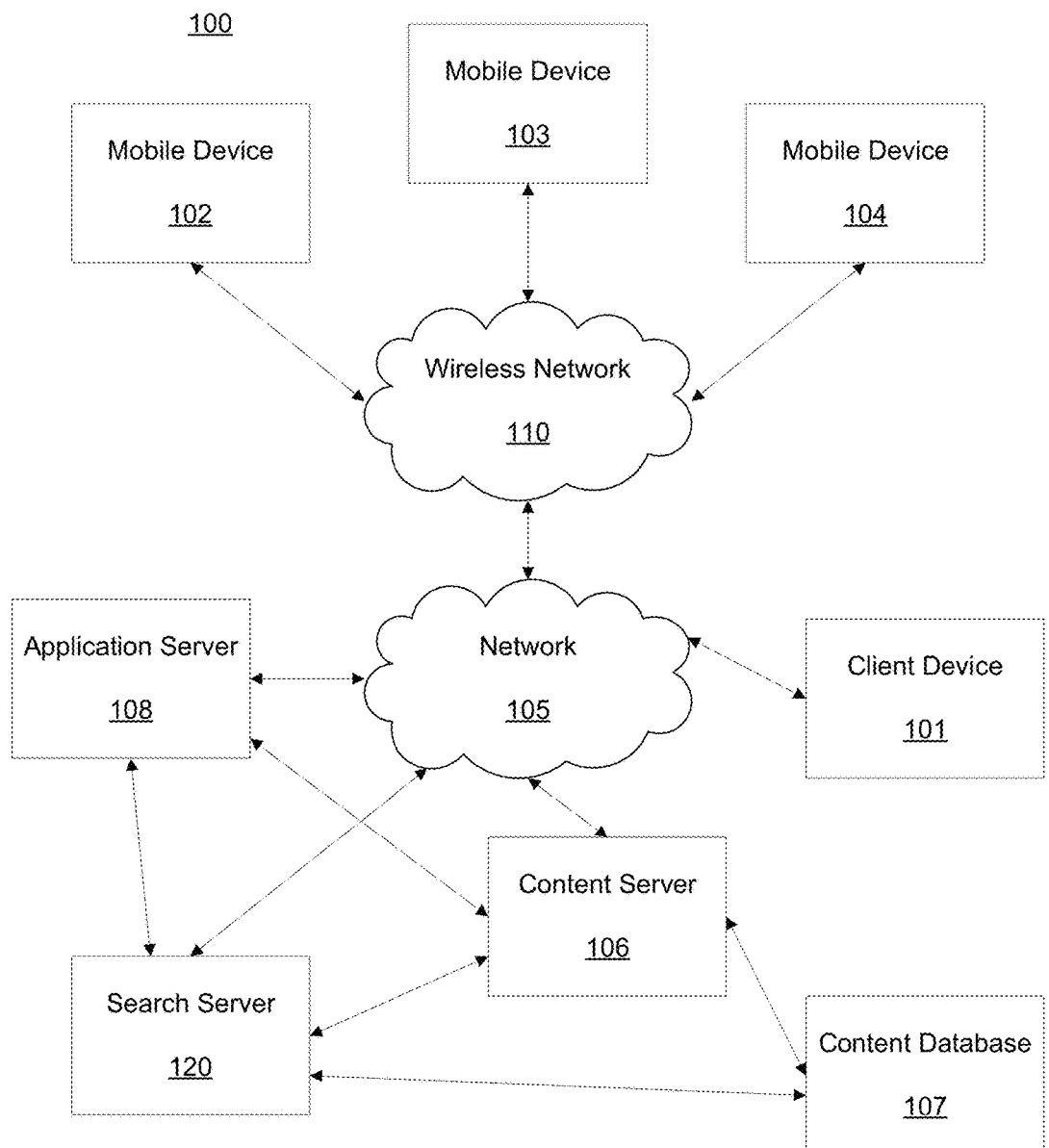
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, short message service (SMS), or multimedia message service (MMS), including via a network, such as a social network. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. According to embodiments of the instant disclosure, as discussed herein, the disclosed systems and methods provide a novel framework for real-time capability to the detection and remediation of computer network security incidents, which traditionally require the collection and interpretation of disparate data, processes, policies and events. As one of skill in the art would understand from the disclosure herein, longer term, the disclosed systems and methods lay the foundation for the next generation of autonomic incident response systems.

For purposes of this disclosure, a "business object" is any organizationally-defined component that requires monitoring or management.

For purposes of this disclosure, a "business event" is an electronic representation of actual business events that relate to one or more business objects.

For purposes of this disclosure, an "event class" is one of several categories of business event, each category referencing a particular mix of business objects. For example, categories can include network security events, facility security events, personnel security events, IT system events, and external events.

For purposes of this disclosure, an "event type" is one of an estimated several thousand separate kinds of events. For example: power failure, malware detection, financial transaction, IT system change, employee access grant.

For purposes of this disclosure, an "activity" is an element of a business process that embodies a discrete task or a set of related tasks that may include business objects and/or business events of interest.

For purposes of this disclosure, as "asset" is a type of business object that describes any company-owned information, system or hardware that is used in the course of business activities.

For purposes of this disclosure, "policy" is principle of action that governs the manner in which assets and activities are treated.

For purposes of this disclosure, a "business rule" is the embodiment of policy implementation for assets and activities.

According to some embodiments of the instant disclosure, as discussed in more detail below, the disclosed systems and methods provide an ontology-based context model for formally describing the interaction and interdependencies amongst activities, assets, events, policies and business rules as elements of business processes within the system.

According to some embodiments, the disclosed IMRS systems and methods provide a novel computer security incident response management system. In some embodiments, the IMRS systems and methods provide a coordinated framework, system, platform or service that dynamically ingests, assesses and manages a security incident, such as a data breach. Once a security event has been evaluated and scored, a formal incident and a corresponding incident response plan may be dynamically defined to adaptively guide the remediation process. The incident response plan is formalized as a project and each project record is further enhanced by adding risk metrics, severity rating, collaborative analysis and categorization.

In some embodiments, the present disclosure provides for the definition of computerized custom risk assessment templates for system elements that represent a structured, intuitive method for the definition of security controls, risk tests and qualitative risk value assessments. This guided user interface (UI) aids users in identifying and highlighting security controls, vulnerability issues, business impact and/or risks that require special attention. A series of generic or default computerized custom risk assessment templates may be used for assets, activities, events or policies that are not substantially differentiated. The templates are used to assess the risk profile of each system object over time. Users have the opportunity to select the learning model used for each risk category and quantitative values are established based on the selected model. Templates are versioned based on user modifications and audit trails are maintained to provide snapshot risk profiles that are evaluated using sensitivity analysis for affiliated system objects.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and search server 120.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including, but not limited to, 2nd (2G), 3rd (3G), and/or 4th (4G) generation radio access for cellular systems (and/or other advances in such technology including, for example, $5^{th}$ (5G) generation radio access), WLAN, Wireless Router (WR) mesh, and the like. Access technologies such as 2G, 3G, 4G, 5G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, email services, photo services, web services, third-party services, audio services, video services, instant messaging (IM) services, SMS services, MMS services, FTP services, voice over IP (VOIP) services, or the like. Such services, for example a search engine and/or search platform, can be provided via the search server 120. Examples of content may include images, text, audio, video, or the like, which may be processed in the form of physical signals, such as electrical signals, for example, or may be stored in memory, as physical states, for example.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, search servers, email servers, social networking services servers, SMS servers, IM servers, MMS servers, exchange servers, photo-sharing services servers, and travel services servers, via the network 105 using their various devices 101-104. In some embodiments, applications can be hosted by the application server 108 (or search server 120 or content server 106). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
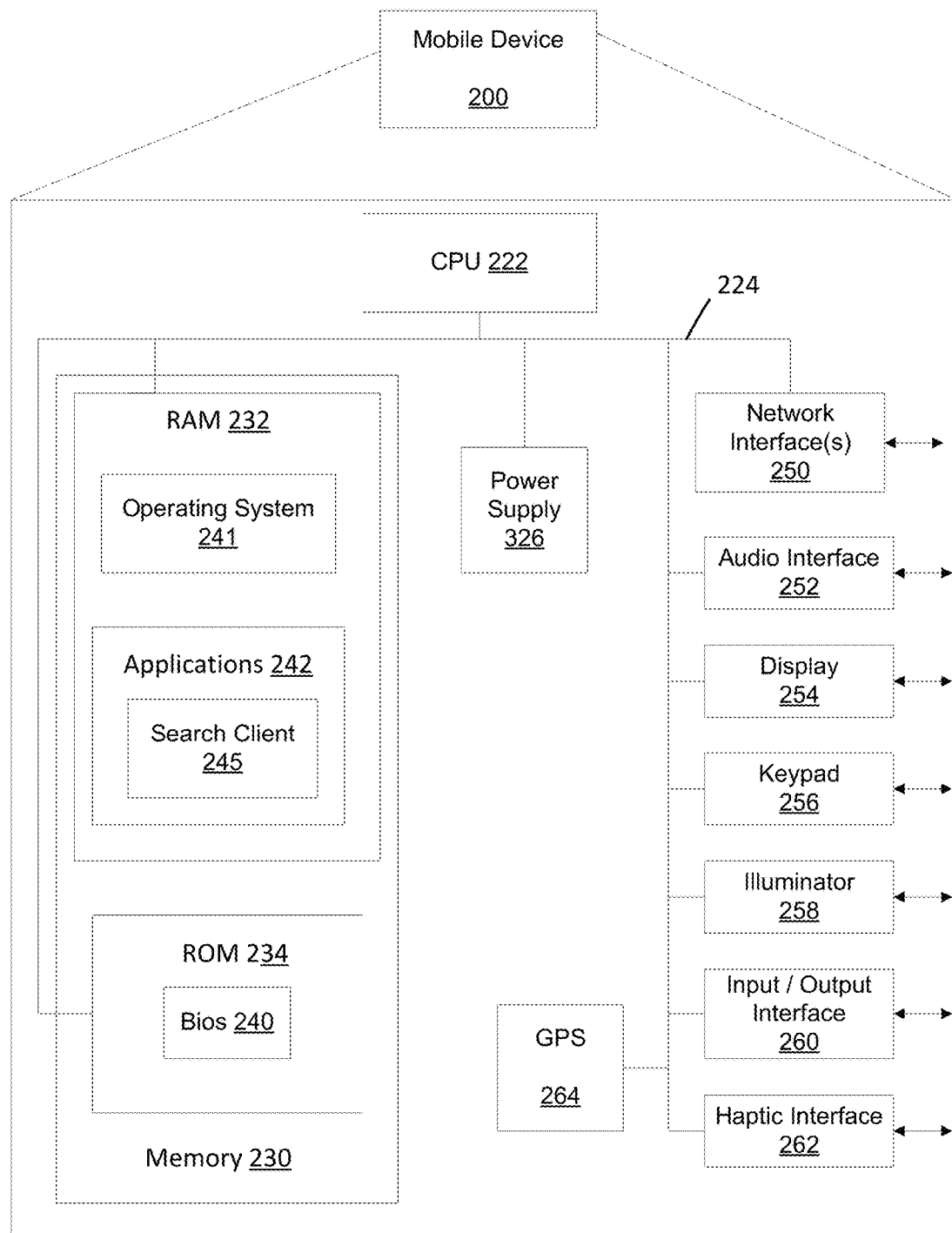
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra-wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed.

Having described the components of the general architecture employed within the disclosed systems and methods, the components' general operation with respect to the disclosed systems and methods will now be described.

Figure 3:
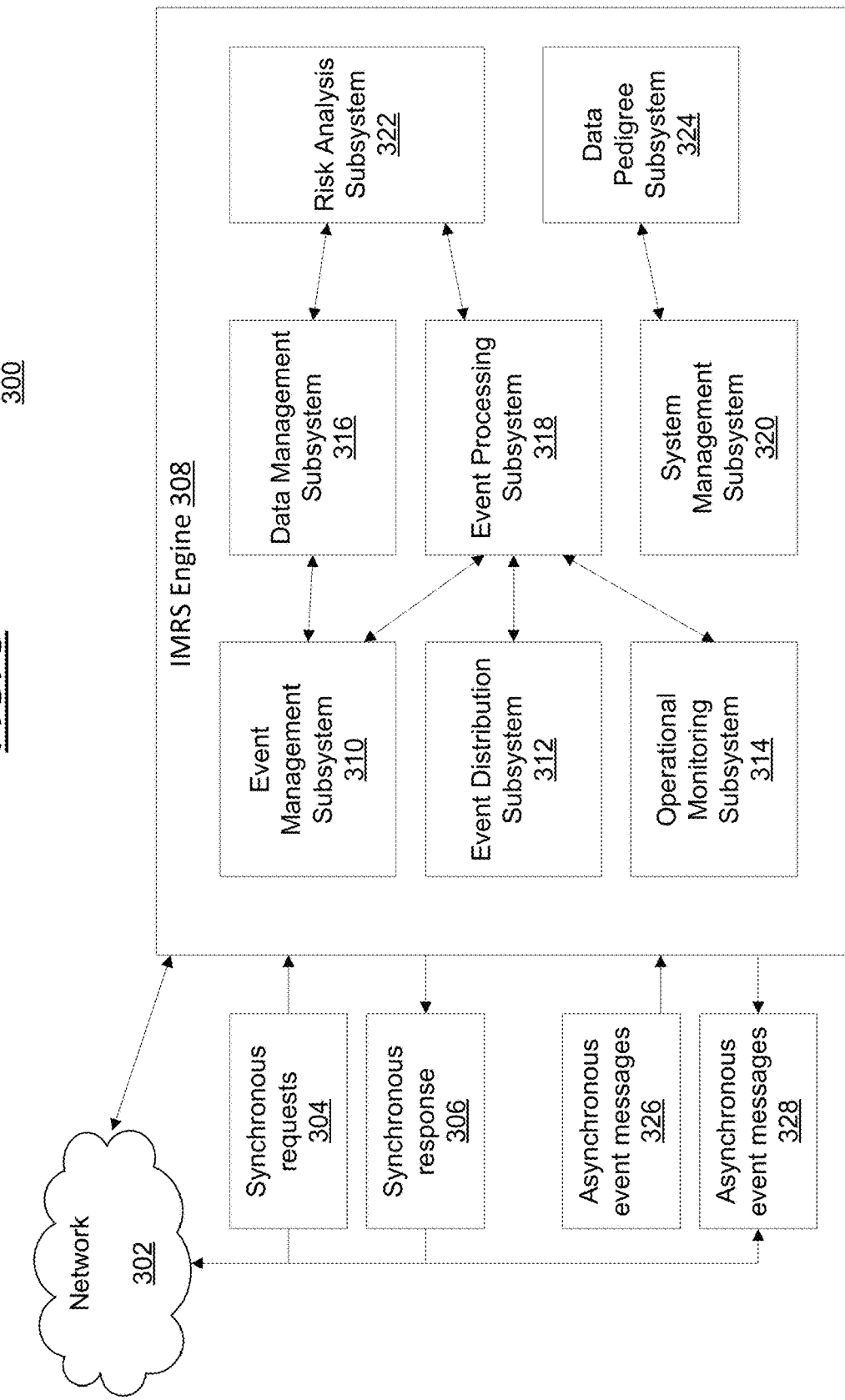
FIG. 3 illustrates a system block diagram of the IMRS and the logical flow of data amongst subsystems in accordance with some embodiments of the present disclosure.

FIG. 3 is a block diagram illustrating the components of system 300 for performing the systems and methods discussed herein. FIG. 3 includes network 302 and IMRS engine 308, which receives and communicates messages 304-306 and 326 and 328, as discussed in more detail below. The IMRS engine 308 is a special purpose machine or processor and could be hosted by a web server, search server, content provider, application server, service provider, user's computing device, or any combination thereof. The IMRS engine 308 can be embodied as a stand-alone application downloadable to a server device and/or a user's device, or as a web-based (e.g., cloud-based) application that enables interaction with its hosting server via an interface (UI) depicted on the user's device.

As discussed above, with reference to FIG. 1, the network 302 can be any type of network such as, but not limited to, a wireless network, a local area network (LAN), wide area network (WAN), the Internet, or a combination thereof. The network 302 facilitates connectivity of the IMRS engine 308 with resources and entities on the network 302. Indeed, as illustrated in FIG. 3, IMRS engine 308 can be directly connected to any number of databases and/or entities by any known or to be known method of connecting and/or enabling communication between such devices and resources.

The principal processor, server, or combination of devices that comprises hardware programmed in accordance with the special purpose functions herein, referred to for convenience as IMRS engine 308, includes event management subsystem 310, event distribution subsystem 312, operational monitoring subsystem 314, data management subsystem 316, event processing subsystem 318, system management subsystem 320, risk analysis subsystem 322 and data pedigree subsystem 324. It should be understood that the engine(s) and subsystems discussed herein are non-exhaustive, as additional or fewer engines and/or subsystems may be applicable to the embodiments of the systems and methods discussed. The operations, configurations and functionalities of each subsystem, and their role within embodiments of the present disclosure will be discussed in detail below in relation to FIGS. 4A-4F.

According to some embodiments of the IMRS engine 308, the event management subsystem 310 analyzes each inquiry or event through its processing activities, the majority of which are standardized and independent of the specific inquiry or event. This includes assessing the pedigree, validity and impact of computer generated security events as well as orchestrating the execution of a disciplined incident management process. The actions performed by subsystem 310 can include, but is not limited to, invoking the data management subsystem 316 to populate memory images of business objects and event histories; priming the event processing subsystem on behalf of each business object associated with an event; invoking the data management subsystem 316 to store any status changes and the new event; and invoking the event distribution subsystem 312 to publish any output events for downstream systems.

The disclosed event processing subsystem 310, in some embodiments, operates as the core of IMRS engine 308's business processing using a state machine and business rules engine to execute process steps and apply policies associated with each core object subclass, as discussed in more detail below. For example, such processing can involve, but is not limited to, centralizing all business decisions based on a customizable business rules engine; providing a state model used to monitor incident lifecycle activities; and the execution of auxiliary services as needed, to include services internal or external to IMRS engine 308.

According to embodiments of the instant disclosure, the event distribution subsystem 310 handles the formatting and delivery of system generated events to endpoint targets. Targets include, for example, other customer systems, notification services, external systems, third party stakeholders and subscribed personnel, and the like. Such formatting and delivery, as discussed in detail below, can include, but is not limited to, applying a configurable publication model, validating destinations addresses, protocols and tracks responses against a dedicated and highly tuned data store; and making policy-based class-of-service decisions and destination-based bundling possible, and the like.

According to embodiments of the instant disclosure, the data management subsystem 316 stores and retrieves information about business objects. Such storage involves, for example, storing and retrieving historical events associated with business objects; detecting event "collisions", which occur when a second event about a business object begins processing while an earlier event is being processed (e.g., the results of the first event are not ready for the processing of the second); recycling events when processing is interrupted or collisions are detected; queueing and generating timer events efficiently; and supporting state processing along the lines of "if this current incident status persists for eight hours or more, generate a notification event . . . ", and the like.

According to embodiments of the instant disclosure, the data pedigree subsystem 324 captures and evaluates the pedigree and credibility of event data as well as the metadata used to enrich events, which can be determined and received from system management subsystem 320. The data pedigree subsystem 324 involves, for example, enabling a focus on information integrity and change management of business rules and system configuration; proactive identification of data quality issues and information inconsistencies; full lifecycle auditability and "evidence locker" functionality for ensuring forensic evidence is preserved without tampering; standardized metadata schema for capturing the manner of data collection and chain of modification as data is processed and assessed; analyzing the environment and making exact measurements as to how security should fit required functions, and the like.

According to embodiments of the instant disclosure, the risk analytics subsystem 322 dynamically quantifies the risk associated with events, incidents, assets, activities, policies and business rules, which is based off of the information received from the data management subsystem and event processing subsystem 318.

The risk analytics subsystem 322 facilitates the creation of Boolean-style, testable questions which represent a business object's associated policies and security controls which are evaluated based on dynamically generated test results and compared against indicators of compromise. As discussed in more detail below, these results are provided as a baseline context for the business object specific risk model. Subsequent evaluations of the model are captured in probability distribution tables an updated on an event-by-event basis.

The risk analytics subsystem 322 also conducts a sensitivity analysis through simulation with verified business object attributes and context against a repository of threat data. Relevant variables are examined to develop a risk quantile using factors including, but not limited to: varied indicators of compromise; historical threat precedence for the asset; change management activities; alterations in configuration models, and the like, or some combination thereof.

Using the sensitivity analysis results, subsystem 322 defines, determines or otherwise calculates an integral based on the fluctuations of event risk. For example, according to some embodiments, the Wiener process (or any other known or to be known continuous-time stochastic process) can be used to model the threat "noise" and produce a stochastic differential equation that generates the probability of a security incident over time. This probability is assigned to the event and used to label false positives, false negatives, and valid alerts, as discussed in more detail below.

The risk analytics subsystem 322 can determine the business impact assessment (BIA), as discussed in more detail below. The equation used for business impact assessment depends on a running probability distribution that is seeded with data from property and casualty (P&C) insurance actuarial tables:

$$\Sigma((b*s)/n)*p, \qquad (Eq. 1)$$

where b=Business Process Criticality Ratings; s=Sum of real-time activity risk measurements; n=Number of dependent business processes; and p=Probability of failure (probability distribution based on sum of risk measurements).

According to embodiments of the instant disclosure, the operational monitoring subsystem 314 validates IMRS data and services by actively monitoring and testing system connections, thresholds, performance and service levels. As evidenced from the discussion herein, the IMRS engine 308 receives synchronous requests 304 and provides synchronous responses 306 utilizing the techniques discussed herein in response to network based or API requests received over network 302. The IMRS engine 308 also receives and provides the output from the IMRS engine 308 analysis, as discussed below, via asynchronous event messages 326, 328, respectively, which are output via the operation monitoring subsystem 314. For example, subsystem 314 has functionality to receive event messages (e.g., items 304 and/or 326) for alerts and provide the output of the IMRS engine 308 (items 306 and/or 328).

According to embodiments of the instant disclosure, the system management subsystem 320 monitors all system components, subsystems and modules. Subsystem 320 provided functionality for supporting the automated policy-based orchestration and provisioning of services from internal registry based on context. Subsystem 320 further provides an interface (UI) to enterprise system management infrastructure and the event notification subsystem for alerts. Subsystem further supports the need for distributed troubleshooting and other support activities, as evidenced from the discussion below.

According to some embodiments, a finite state machine can be utilized by the IMRS engine 308 for the execution, tracking and monitoring the NIST compliant security incident management process. Such embodiments can support the inclusion of specific incident category "playbooks." In some embodiments, a the disclosed engine 308, or a connected or associated logical subsystem (which may be separate from engine 308) can generate security incident lifecycles, play back the associated events, and track responses and response time (referred to as digital cybertagging testing. Such engine/subsystem can, for example, facilitate the dynamic generation of tests that require interacting and then monitoring emanations from the target device, process or software for indicators of a particular state such as secure or insecure, vulnerable or protected, on or off.

As understood by those of skill in the art, the testing and verifications or validations performed by the engines and subsystems discussed herein meet the specifications of the ISESEC OSSTMM model for security testing; permit analysts to "game" the system by creating customized testing events that test assumptions; customize virtual incidents that are fully processed by IMRS (where the only differences being that they can be assigned a lower priority, have recognizably invalid IP addresses, and are filtered out of the output); and enrich the event or incident record to help triangulate the efficacy of the perceived vulnerability, and the like.

Thus, the disclosed IMRS engine 308 can provide full-coverage functionality testing quickly and consistently; provide a mechanism for performing whole system audit checks and stress testing; aid in the identification of false positives, false negatives, and the like. The IMRS engine 308, via the disclosed and executed systems and methods discussed herein, provides functionality for generating events at low volume to provide definitive end-to-end system health verification and end-to-end service level measurement as well as system testing new functionality and regression testing existing functionality.

In some embodiments, the IMRS engine 308 can perform human-computer collaborative learning with digital after-action reviews and simulations (e.g., machine learning or AI), which provide the device(s) or networks hosting the IMRS engine 308 with added functionality of, but not limited to, enabling virtual collaboration in the review of an incident response lifecycle by inviting participants to comment and rate each task, event, activity or incident response in an open and honest fashion; maintaining a knowledge base and a documented review for continuous improvement;

and satisfying compliance requirements in the evaluation of incident response process integrity and performance.

As mentioned above, the functionality of each subsystem of the IMRS engine 308 will be discussed in detail with reference to FIGS. 4A-4F.

Figure 4C:
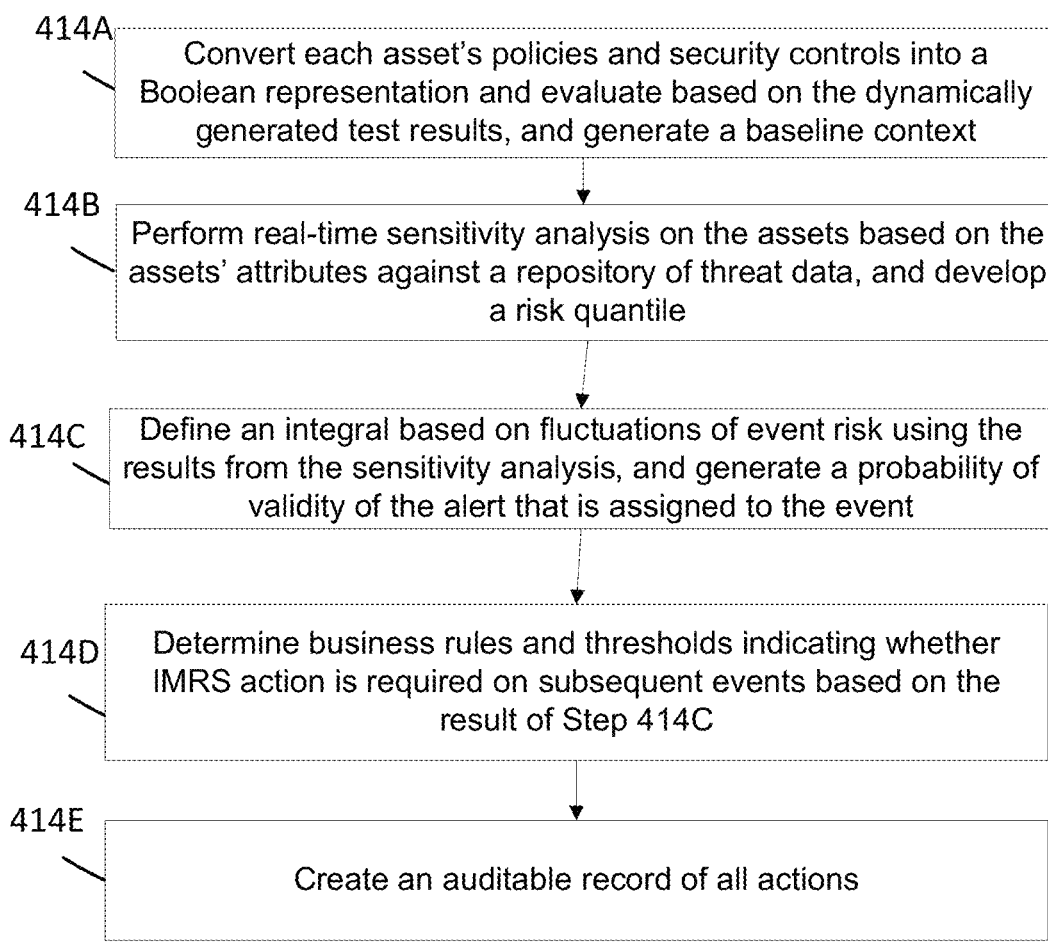
FIG. 4C illustrates a non-limiting data flow of the iterative quantitative assessment performed by the IMRS in accordance with some embodiments of the present disclosure.
Figure 4D:
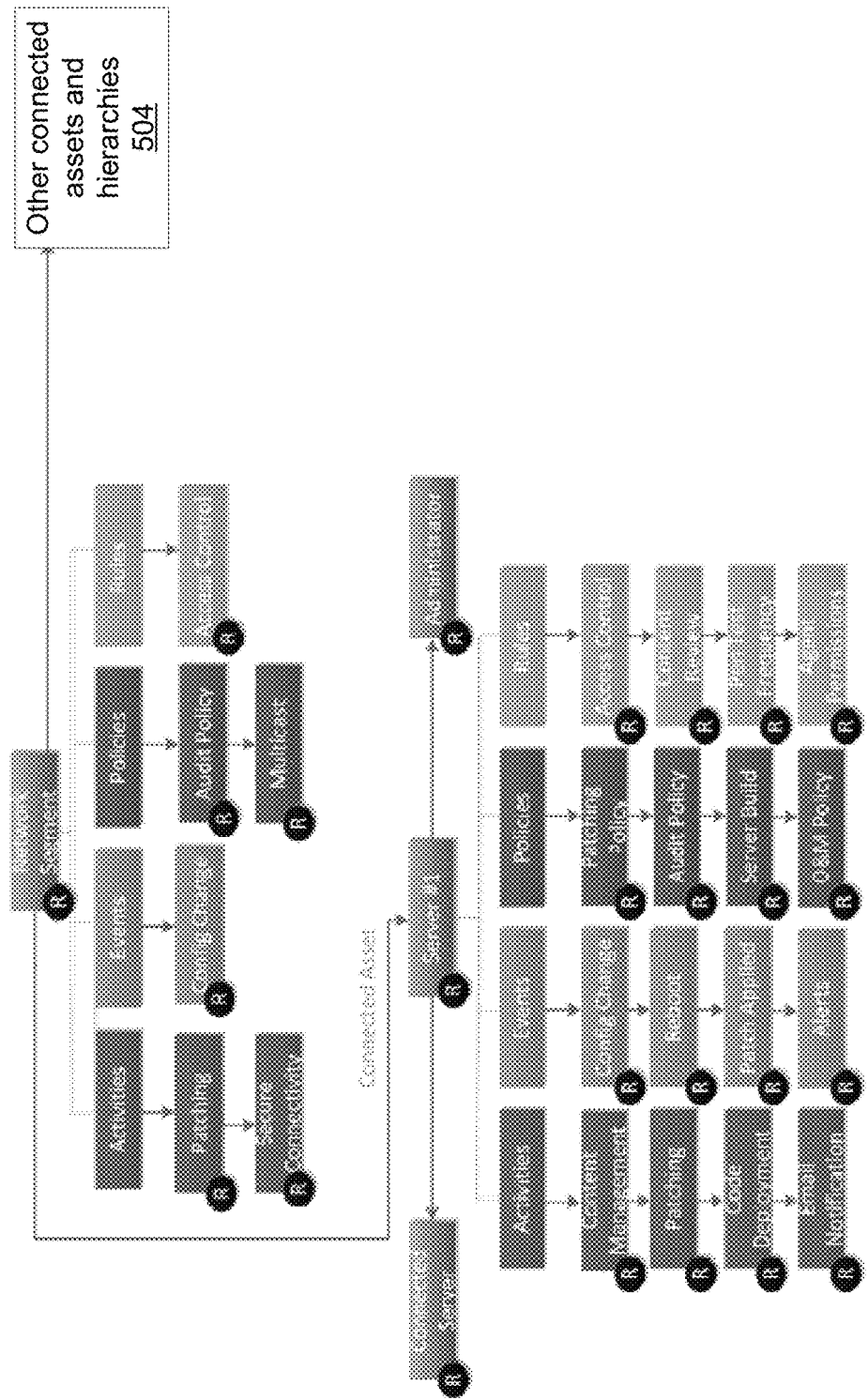
FIG. 4D illustrates a non-limiting example of the calculation of risk as it applies to the quantitative assessment of each element in accordance with some embodiments of the present disclosure.
Figure 4E:
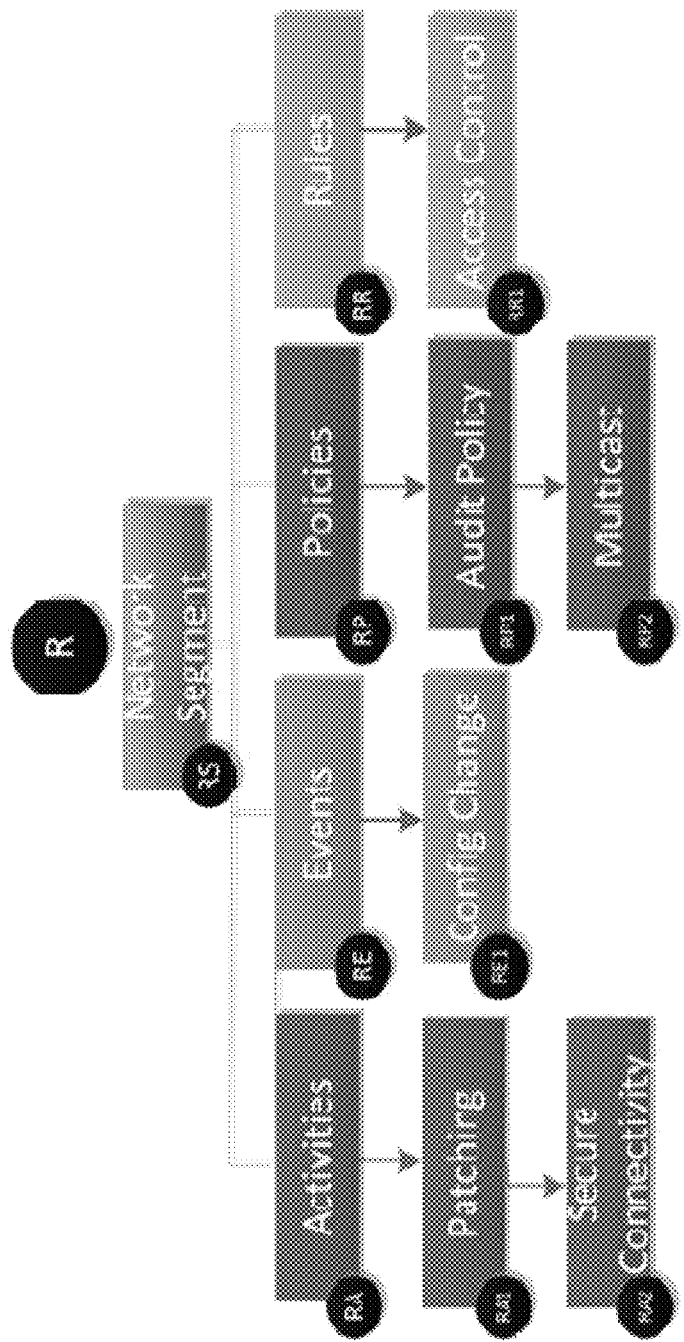
FIG. 4E illustrates a non-limiting example of the calculation of business impact associated with a sample system scenario in accordance with some embodiments of the present disclosure.
Figure 4F:
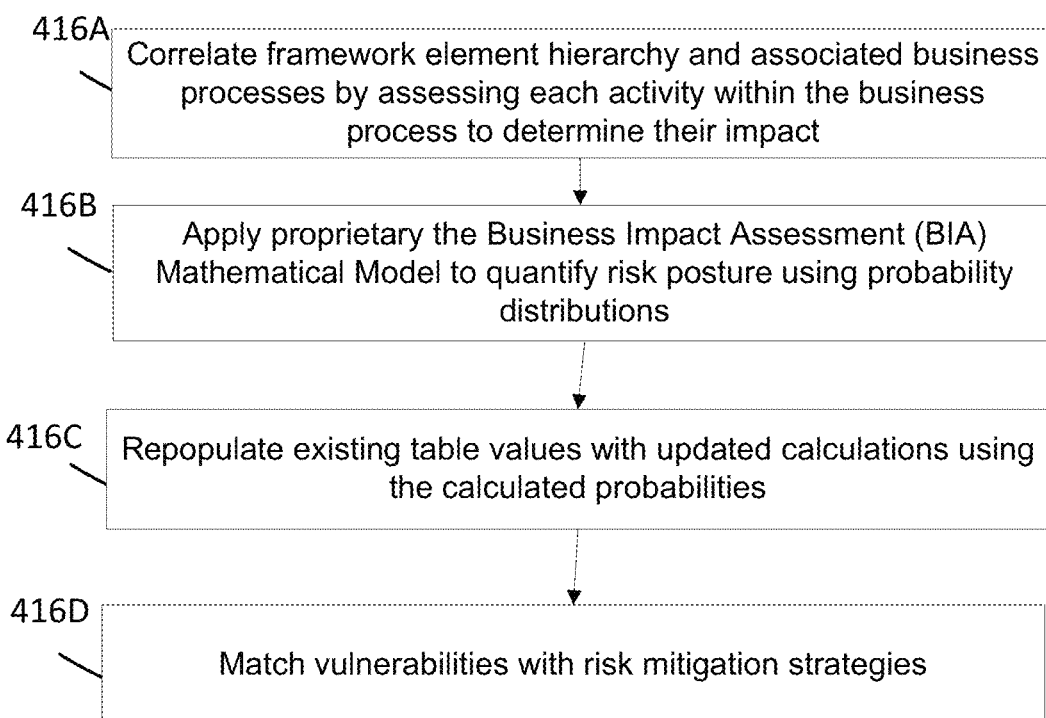
FIG. 4F illustrates anon-limiting data flow of the business impact assessment performed by the IMRS in accordance with some embodiments of the present disclosure.

Turning now to FIGS. 4A-4F, the instant disclosure will detail the embodiments of the logical system and architecture being executed and implemented to identify security events and mitigate their impact on networked systems. FIG. 4A details Process 400 which involves the ingestion, evaluation, testing and storage of events entering the IMRS engine 308 using the ESB capability. FIG. 4B illustrates a non-limiting process and data flow associated with the cybertagging testing performed by the IMRS engine 308. FIG. 4C illustrates a non-limiting data flow of the iterative quantitative assessment performed by the IMRS engine 308. FIG. 4D illustrates a non-limiting example of the calculation of risk as it applies to the quantitative assessment of each element. FIG. 4E illustrates a non-limiting example of the calculation of business impact associated with a sample system scenario. (FIGS. 4D-4E provide detail and example calculations of the BIA and related element risk calculations, as discussed in detail below). And, FIG. 4F illustrates anon-limiting data flow of the business impact assessment performed by the IMRS engine 308.

Process 400 of FIG. 4A begins with Step 402 where an alert notification associated with a security alert (e.g., security alert message) is received and an alert message is generated upon the detection that an activity is being performed or is being attempted to be performed (which may or may not be permitted). The alert can be based from any of the assets of a computing networking detecting a security breach, threat, attempt or the like, and such assets can include, but are not limited to, security appliances, intrusion prevention appliances, servers, user devices, firewalls, intrusion detection appliances, users, security software and access points, and the like. The routing and enrichment of messages is performed dynamically based on the event attributes to include elements of overall situational context. For example, an event downstream from the hosted IMRS engine 308 is detected and as a result the IMRS engine detects the event message (or generates the event message based on the alert).

In Step 404, the alert is analyzed in order to identify the event and its associated attributes (i.e., data and metadata), and is formatted into an security message according to these identified attributes. Such formatting involves validating the message for further processing by the IMRS engine 308, such that the message can relay the characteristics of the event.

In Step 406, the generated and validated event message from Steps 402-404 is parsed and analyzed for subsequent processing along Process 400. For example, a binary derivative of the event message is parsed, its attributes are identified, and the parsed message and its attributes are indexed later search and retrieval.

In Step 408, related information corresponding to the event data is identified from an asset database, and subsequently retrieved upon its identification. For example, the event data can be used as part of a query of the asset database (e.g., configuration management database (CMBD)) in order to identify assets that have similar features (satisfying a threshold value) to the event data.

In Step 410, upon identifying a set of assets from Step 408, an asset hierarchy is built, created or otherwise generated by the IMRS engine 308 based on the event data and the retrieved asset information. For example, the hierarchy can include, in a relationship-defined order, but is not limited to, assets, activities, events, policies and rules, and the like, or some combination thereof. The hierarchy can be a table (e.g., a look-up table (LUT) or other type of data structure readable by a computer) that relays how the assets and event(s) are related, and how each asset and the event's policies, rules and activities are related. For example, the hierarchy can include, but is not limited to, event history (all events recorded for an asset), activities (processes that use or are affected by the asset), related assets (other assets that are affected by the asset), and policy and security controls— where each node in the hierarchy is iteratively processed to populate the risk model and quantify threat exposure, as discussed in more detail below in relation to item 414 and FIG. 4D.

In Step 412, the IMRS engine 308 performs cybertagging of the information within the hierarchy in order to verify controls, scope and state information. Such cybertagging, as discussed herein, can be performed in accordance with the Open Source Security Testing Methodology Manual (OSS-TMM) Model.

According to some embodiments, example steps of the cybertagging performed in Step 412 is illustrated in FIG. 4B, in Steps 412A-412H. According to embodiments of the instant disclosure, all system events (to include alerts) are validated and enriched using digital cybertagging testing in real time. Digital cybertagging testing makes it possible to draw direct inferences regarding the implementation of specific security controls, the state of specific assets and/or business processes and the veracity of alert information. Resulting emanations of these tests are captured and catalogued with the original event to calibrate risk within a specific context and may trigger additional downstream events, further testing, and the like.

In Step 412A, the security message can be analyzed in order to identify its attributes (as discussed above in Steps 402-406). In some embodiments, they may involve identifying those identified attributes from the above Steps. In Step 412B, the related assets are also identified in order to identify the control (and/or other activities and policies) of the assets. As mentioned above, this can involve identifying the attributes of the event and assets from the built hierarchy.

For example, the event can have attributes including, for example: IP address, Host name, Mac Address, type of event (e.g., vulnerability type: Malware), and the like. The asset controls can have attributes include, for example, restricted routes/IPs, device credentials, operational modes, and the like.

In Step 412C, the IMRS engine 308 creates cybertagging tests based on the relevant asset and environment controls (e.g., (network, policies, rules and infrastructure), and validates the security message based on the created tests (i.e., by applying the tests to the message). In Step 412D, based on the results of the test(s), it is determined if the alerts in the security message is to be categorized as an incident, and if so, then label the event as an incident (Step 412E). That is, if all control verification tests confirm the alert (or a statistically relevant sample), then the event is to be categorized as an incident.

In Step 412F, the target devices are also tested, and in some embodiments, as are the potential operators if manual intervention is required. In some embodiments, Step 412F involves analyzing the message and the attributes of the event and assets, and the target devices to determine if manual intervention is required, and if so, then the operations are also tested. In some embodiments, such testing involves using known IP testing to filter the cybertag of the devices.

In Step 412G, a filter is applied to determine emanations of cybertagging. In other words, emanations from the tests of controls and devices are determined and the security message can by cybertagged accordingly.

In step 412H, a determination is made regarding the validation of the alert in the security message based on such cybertagging. That is, a correlation is made back to the original event (e.g., the received alert and/or generated security message) with insight (e.g., a cybertag) regarding the results of the cybertagging tests performed in Process 412. For example, such correlation can involve the validation of an intrusion alert based on a manufactured test (cybertag) for a specific server address.

Turning back to FIG. 4A, Process 400 continues with Step 414 where the IMRS engine 308 iteratively assess the impact of the event triggering the alert message on each element in the asset hierarchy. According to some embodiments, for example, as illustrated in FIG. 4C, Step 414 can involve sub-Steps 414A-414E. Step 414A beings with the assessment involving running through business rules and controls in order to assess the alerts damage. In some embodiments, the IMRS engine 308 converts each asset's policies and controls into a Boolean representation, evaluates them based on the dynamically generated test (cybertagging) results (as discussed above), and compares them against indicators or compromise. The results are provided as a baseline context model.

Step 414B involves running a real-time check of a threat repository. In some embodiments, the IMRS engine 308 performs real-time sensitivity analysis on the assets based on the assets' attributes and the baseline context against a repository of threat data, and develops a risk quantile which, for example, varies indicators of compromise, examines and identifies historical threat precedence for the asset, examines change in management actives, introduces new configuration models and substitutes variants.

Step 414C involves quantifying a risk posture of the network, devices and/or the IMRS system, and the like, In some embodiments, as discussed above, using the sensitivity analysis results, an integral is defined based on the fluctuations of event risk. The Wiener process (or any other known or to be known continuous-time stochastic process) can be used to model the threat "noise" and produce a stochastic differential equation that generates the probability of a security incident over time. This probability is assigned to the event and used to label false positives, false negatives, and valid alerts.

Step 414D involves spawning downstream events and alerts as needed. In some embodiments, the IMRS engine 308 leverages relevant business rules and thresholds to determine if any immediate system action is required based on the output of the quantification performed in Step 414C.

Step 414E involves creating auditable record of all actions. In some embodiments, each calculation and triggered action is captured and stored to ensure all system analysis and logic can be scrutinized for both organizational learning (e.g., machine learning or AI techniques implemented by the IMRS engine 308) and compliance purposes.

Turning to FIG. 4D, each node in the hierarchy 414F is iteratively processed to populate the risk model and quantify threat exposure. As mentioned above, the hierarchy 414F can include, but is not limited to, event history (all events recorded for an asset), activities (processes that use or are affected by the asset), related assets (item 504—other assets that are affected by the asset), and policy and security controls. According to some embodiments, the auditable record, which includes he risk calculation discussed herein, can be a single value for a hierarchical node represented by the continuous model differential equation represented in FIG. 4D, item 414F.

The entry point for risk calculations is typically an alert related to a specific element but may be the addition of a new rule, code deployment and the like. The risk calculated in operational context as it relates to a specific element (R, as referenced in FIG. 4D), and the related business process. Pure risk (R) rate quantile based on the continuous model 414F equals:

$$\Sigma(((b*c)+(t*tv))/s)*1/d, \qquad (Eq. 2),$$

Where b=business criticality rating; c=capital value index; s=security control ratio (Index value relating to the number of applicable NIST SP 800-53 controls vs. number of controls successfully implemented); t=threat, vulnerability and probability (index value relating to the nature of the threat(s), severity of the threat(s), known vulnerabilities and probability of compromise); tv=template value (each element is assigned a risk template with default questions that are answered with digital cybertagging testing—the questions represent residual risk such as ownership, training, and the like, and can be customized; and d=level (separation degree from primary element affected by event).

Thus, in line with the above discussion, the hierarchical depiction in FIG. 4D is an example of a network segment having a hierarchical relationship with other network elements such as, for example, Server #1. The network segment has its related activities, events, policies and rules; similarly, Server #1 has its own related activities, events, policies and rules. A risk rate calculation (R) is made for the network segment based on the risk rate calculations for each activity, event, policy and rule, as discussed above. FIG. 4D indicates each activity, event, policy and rule for which a risk calculation is performed (indicated by "R" in a circle) based on Eq. 2.

Turning back to FIG. 4A, Process 400 continues with Step 416, where a Business Impact Assessment (BIA) mathematical model is calculated based on the results of Step 414.

The discussion here provides some specific numerical examples for the risk rate values: activities are represented by "RA" and include "RA1" for the patching activity and "RA2" for the secure connectivity; events are represented by "RE" and include "RE1" for configuration changes; policies are represented by "RP" and include "RP1" for the audit policies and "RP2" for multicast policies; and rules are represented by "PR" and include "RP1" for access control rules.

The overall risk for the network segment can be represented by "R" and can be calculated based on the risk values from the activities, events, policies and rules, according to Eq. 3 (below). It should be understood that different network segments can have different activities, events, policies and rules, and can have differing numerical values.

Once the individual risk values are calculated, then BIA can be calculated based on Eq. 4 (below). The business impact assessment quantifies business risk as it applies to core business processes.

The BIA measurements discussed in relation to FIG. 4E involve a Patch Management example, where such process is broken into six unique activity elements that include: establishing inventory of devices to be patched (12); establish patch baseline by OS (31); retrieve patch status of all target devices (26); determine patching requirements and hot fixes (19); patch all devices (for example: RA1=21); and validate effectiveness of patching (47). The sum of real-time activity risk measurements associated with these six activities are used as the "s" input for the BIA calculation in Eq. 4. The activity elements associated with this business process may be spread across multiple network elements but have the common characteristic of being part of the same business process.

FIG. 4E is utilized to detail the calculation of the BIA. FIG. 4E illustrates an event which affects a node hierarchy, which is assigned a BIA. It is derived by taking the activities and mapping them to its parent business process (in this example, Patch Management). All activities for this business process illustrated in FIG. 4E (including the activity in this hierarchy) can be used as inputs for establishing the BIA measurement.

As illustrated in FIG. 4E, the nodes on the shown hierarchy have "R" values, as detailed herein:

$$R \text{ (risk)} = RS + (RA/2) + (RE/2) + (RP/2) + (RR/2), \quad \text{(Eq. 3)}$$

which for purposes of this example, equals 159.2, as explained herein.

RS, where (as an example) b=7; c=6; s=0.67; t=5; tv=4.5; and d=1. Therefore, RS equals $(((7*6)+(5*4.5))/.67)*1/1=96.2$.

$$RA = RA1(21) + RA2(17) = 38.$$

$$RE = RE1(14) = 14.$$

$$RP = RP1(34) + RP2(24) = 58.$$

$$RR = RR1(16) = 16.$$

$$BIA = E((b*s)/n)*p, \quad \text{(Eq. 4),}$$

wherein b = business process criticality rating=2;
s=sum of real-time activity risk measurements=156;
n=number of dependent business processes=1; and
p=probability of failure (probability distribution based on sum of risk measurements)=0.013.

Therefore, in this example, BIA=((2*156)/1)*0.013=4.05.

Turning to FIG. 4F, a flowchart is shown that details the specific steps upon determining the BIA. As discussed above, the BIA is based on the framework element hierarchy model and the related incident response lifecycle context. The framework hierarchy model is a security ontology describing the relationships between organizational assets, activities, events, policies and business rules. Each element in the hierarchy (as illustrated in FIG. 4D) can have its own hierarchical arrangement based on its relationships—for example, a specific server (asset) can have other servers (assets) in its network. This hierarchy is systematically scrutinized (in Step 414 of Process 400) for indicators of compromise as discussed above. Each element's potential vulnerabilities have already been rated and ranked at both an individual and organizational level. Here, Step 416 generates an aggregate, quantified risk posture by correlating risks with business functions and providing recommended risk mitigation strategies.

Step 416, as per FIG. 4F, beings with correlating framework hierarchy and associated business process. Step 418A. In some embodiments, each activity within the business process is accessed and analyzed in order to determine their impact. An example can involve assessing the tasks associated with publishing content to a server. Editing and publishing the content requires authorizations that require security controls. The overall business process is only as secure as its sub-tasks.

In Step 418B, the BIA model is applied to the hierarchy to quantify risk using probability distributions. For example, the discussion above related to FIG. 4E.

In Step 418C, using the calculated probabilities, the IMRS engine 308 repopulates the existing table values with updated calculations. For example, such tables include, but are not limited to, P&C insurance asset actuarial tables; probability distribution tables, and the like.

In Step 418D, the vulnerabilities identified by the results of Steps 418A-418C are leveraged in order to match them to risk mitigation strategies in order to avoid having such vulnerabilities occur again. Thus, the result here can include creating and disseminating over a network strategies and protocols that detect and eliminate like threats should they again be detected.

Turning back to FIG. 4A, by way of a non-limiting example, in relation to, and as a summary of Steps 406-416 of Process 400 and its sub-process described in relation to FIGS. 4B-4F, additional data is gathered by the IMRS engine 308 to enrich the event data based on the hierarchy of related assets, activities, events, policies and business rules (Steps 406-410). For example, this enrichment step may gather data based on the asset type, origin, associated history, creation time/date and related business process attributes. A series of dynamically generated cybertagging tests may also be used to produce emanations that serve to inform risk template responses, asset state, verification of data or corroboration of historical event data (Step 412).

According to some embodiments, a comprehensive iterative analysis is then initiated, which cycles through the generated asset hierarchy to scrupulously deliberate the correct function of system controls, related indicators of compromise, quantification of risk posture (for prioritization) and the careful memorialization of all analysis for audit purposes (Step 412). This process may also include the triggering of downstream events (such as notifications) based on the recognition of certain system thresholds or threat conditions (Step 414). The data generated is added to the asset construct and a full business impact analysis is conducted which formalizes potential vulnerabilities and risks in the context of related business processes (Step 416). Quantification techniques are used to model the probability of compromise and associated analytical table structures are updated to reflect the implications of the analysis (Step 416).

Continuing with Process 400 continues with Step 418 where the IMRS engine 308 generates a user interface (UI) that is communicated over the network for display in order to provide the results of the calculated and applied BIA. For example, the results can be provided to a security analyst, and enables the analyst to address, respond, and/or fix the identified threat. The UI also provide a visualization of the threat, by illustrating the hierarchy and where the threat originated and how it has spread, as well as how it has impacted particular assets.

According to some embodiments, a comprehensive visualization of the event and all associated, relevant meta data (such as source, communication channels, connections, history) are provided to the user (Step 418). In some embodiments, visualization of events and incidents are customizable based on user configuration selections. The visualizations provide drill-down capability on all related event, asset, activity and policy data that has been correlated for an incident. This includes comments and results from third party stakeholders, community-based threat data, best practice recommendations and related systems emanations.

It should be understood by those of skill in the art that the the incident management process phases and best practices used in some embodiments is an embodiment of the NIST Special Publication 800-61 (Rev 2) Incident Response Life Cycle. As an incident moves through the incident response phases, system state changes as represented by phase changes trigger a full assessment of all previously mentioned aspects of the incident in order to validate state, verify existing assumptions and reassess risk posture. In effect, state changes represent an event that initiates the activity sequence discussed in relation to FIG. 4A (and its subparts).

According to some embodiments, during the final phase of an incident (Post-Incident Activity), a digital after-action review can be initiated to provide a structured review or de-brief process for analyzing what happened, why it happened, and how it can be done better by the participants and those responsible for the incident management process. A crowdsourced feedback mechanism can be provided in this process to help enhance knowledge collection and organizational learning for incident response performance improvement. Such mechanisms can be provided by the communicated UI (from Step 418).

In some embodiments, the UI of the IMRS engine 308 offers administration and reporting capabilities for the creation of custom reports, administrative configuration and support for software module maintenance.

As shown in FIG. 5, internal architecture 500 of a computing device(s), computing system, computing platform and the like includes one or more processing units, processors, or processing cores, (also referred to herein as CPUs) 512, which interface with at least one computer bus 502. Also interfacing with computer bus 502 are computer-readable medium, or media, 506, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer executable process steps, incorporating functionality described herein, e.g., one or more of process flows described herein. CPU 512 first loads computer executable process steps from storage, e.g., memory 504, computer readable storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files.

Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 528 typically provides information communication using transmission media through one or more networks to other devices that use or process the information. For example, network link 528 may provide a connection through local network 524 to a host computer 526 or to equipment operated by a Network or Internet Service Provider (ISP) 530. ISP equipment in turn provides data communication services through the public, worldwide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present disclosure are related to the use of computer system 500 for implementing some or all of the techniques described herein. According to one embodiment, those techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

For the purposes of this disclosure, reference to a subsystem or module s in reference to a software, hardware, or firmware (or combinations thereof) system, process or functionality, or component thereof, that performs or facilitates the processes, features, and/or functions described herein (with or without human interaction or augmentation). A subsystem can include subsystems therefrom; a module can include sub-modules; and an engine can include sub-engines, subsystems and submodules. Software components of a subsystem/module may be stored on a computer readable storage medium for execution by a processor. Subsystems/ modules may be integral to one or more servers, or be loaded and executed by one or more servers. One or more subsystems/modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

For purposes of this disclosure, examples of computer code or logic include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, at a computing device, an alert notification indicating a security event with at least one component of a computerized network, said computerized network comprising a plurality of nodes associated with devices and networked services available to such devices;
    analyzing, via the computing device, said alert notification by parsing the data associated with said alert, and based on said parsing, identifying event data related to said security event, said event data providing an indication of a location within the network where said alert originated and a type of security event that triggered said alert;
    retrieving, via the computing device from an asset database associated with the computing device, information associated with assets related to said event data, said retrieving comprising searching said asset database, identifying assets related to said event data and performing said retrieval of said information for said identified assets;
    creating, via the computing device, a hierarchy of related elements based on the event data and the retrieved asset information, said element hierarchy comprising an ontology of the security event and the identified assets, said ontology structured such that relationships between the security event, the assets and their respective information is retrievable from the hierarchy;
    executing, via the computing device, cybertagging testing on the created hierarchy of elements, said cybertagging testing comprising cybertagging the security event by determining, via analysis of the hierarchy of elements in view of cybertagging tests associated with asset and network controls, a validation indication of the security event, a risk assessment and incident categorization of the security event are determined;
    determining, via the computing device based on results of said cybertagging, a value representing an impact of the security event on each of the assets identified in said element hierarchy;
    determining, via the computing device, an impact model indicating how the security event has impacted the computerized network based on said determined values of impact, said impact model comprising identification of vulnerabilities on the network and their associated mitigation strategies; and
    generating and communicating, via the computing device, a user interface (UI) that displays information related to the impact model, said communication of the UI enabling a node on said network to execute at least one of the mitigation strategies in order to thwart a future security event related to said security event.

2. The method of claim 1, wherein said asset information comprises identification of attributes of the assets, said attributes comprising an identity of the assets, a type of the assets, activities of the assets, events the assets are involved in, policies of the assets and rules associated with the assets.

3. The method of claim 2, wherein said cybertagging further comprises:
    dynamically creating said cybertagging tests based on said event data and said asset attributes;
    testing, via execution of the cybertagging tests, target devices of the computing devices;
    determining emanations from testing of the hierarchy and the target devices; and
    determining, based on said determination emanations, validation of the security event and its alert.

4. The method of claim 3, further comprising:
determining whether intervention is required for said cybertagging based on said type of security event; and
performing a known IP test on operators based on said determination.

5. The method of claim 2, further comprising:
iteratively assess the impact of said security event on each asset in said hierarchy, wherein said iterative impact assessment comprising:
converting each asset's attributes into a Boolean representation and evaluating, in accordance with the cybertagging results, each representation in order to generate a baseline context;
performing real-time sensitivity analysis based on each asset's attributes against a repository of threat data, and developing a risk quantile;
determining event risk based on said sensitivity analysis of each asset;
defining an integral based on fluctuations of said event risk; and
generating a probability of validity of the security event based on said integral,
said generation comprising assigning the probability to said security event.

6. The method of claim 5, further comprising:
create an auditable record, said record comprising each calculation and triggered action captured and stored for said iterative assessment.

7. The method of claim 5, further comprising:
determining said risk assessment (R), said determination comprising a calculation comprising:

$$\Sigma(((b*c)+(t*tv))*1/d,$$

wherein b=business criticality rating;
wherein c=capital value index;
wherein s=security control ratio (Index value relating to the number of applicable NIST SP 800-53 controls vs. number of controls successfully implemented);
wherein t=threat, vulnerability and probability (index value relating to the nature of the threat(s), severity of the threat(s), known vulnerabilities and probability of compromise);
wherein tv=template value (each element is assigned a risk template with default questions that are answered with digital cybertagging testing—the questions represent residual risk such as ownership, training, and the like, and can be customized; and
wherein d=level (separation degree from primary element affected by event).

8. The method of claim 1, further comprising:
calculating, based on said determined impact value for each asset in said hierarchy, an impact assessment, said impact assessment determination comprising a calculation comprising:

$$\Sigma((b*s)/n)*p,$$

wherein b=Business Process Criticality Ratings;
wherein s=Sum of real-time activity risk measurements;
wherein n=Number of dependent business processes; and
wherein p=Probability of failure (probability distribution based on sum of risk measurements).

9. The method of claim 1, further comprising:
storing, in an index hosted by a database associated with the computing device, said identified event data.

10. The method of claim 1, wherein said assets comprise devices or applications executing on said network.

11. The method of claim 1, wherein said security event comprises network data indicating a security event selected from a group consisting of: a security breach, a security threat, and a security breach attempt.

12. A non-transitory computer-readable storage medium tangibly encoded with computer-executable instructions, that when executed by a processor associated with a computing device, performs a method comprising:
receiving, at the computing device, an alert notification indicating a security event with at least one component of a computerized network, said computerized network comprising a plurality of nodes associated with devices and networked services available to such devices;
analyzing, via the computing device, said alert notification by parsing the data associated with said alert, and based on said parsing, identifying event data related to said security event, said event data providing an indication of a location within the network where said alert originated and a type of security event that triggered said alert;
retrieving, via the computing device from an asset database associated with the computing device, information associated with assets related to said event data, said retrieving comprising searching said asset database, identifying assets related to said event data and performing said retrieval of said information for said identified assets;
creating, via the computing device, a hierarchy of related elements based on the event data and the retrieved asset information, said element hierarchy comprising an ontology of the security event and the identified assets, said ontology structured such that relationships between the security event, the assets and their respective information is retrievable from the hierarchy;
executing, via the computing device, cybertagging testing on the created hierarchy of elements, said cybertagging testing comprising cybertagging the security event by determining, via analysis of the hierarchy of elements in view of cybertagging tests associated with asset and network controls, a validation indication of the security event, a risk assessment and incident categorization of the security event are determined;
determining, via the computing device based on results of said cybertagging, a value representing an impact of the security event on each of the assets identified in said element hierarchy;
determining, via the computing device, an impact model indicating how the security event has impacted the computerized network based on said determined values of impact, said impact model comprising identification of vulnerabilities on the network and their associated mitigation strategies; and
generating and communicating, via the computing device, a user interface (UI) that displays information related to the impact model, said communication of the UI enabling a node on said network to execute at least one of the mitigation strategies in order to thwart a future security event related to said security event.

13. The non-transitory computer-readable storage medium of claim 12, wherein said asset information comprises identification of attributes of the assets, said attributes comprising an identity of the assets, a type of the assets, activities of the assets, events the assets are involved in, policies of the assets and rules associated with the assets.

14. The non-transitory computer-readable storage medium of claim 13, wherein said cybertagging further comprises:

dynamically creating said cybertagging tests based on said event data and said asset attributes;

testing, via execution of the cybertagging tests, target devices of the computing devices;

determining emanations from testing of the hierarchy and the target devices; and determining, based on said determination emanations, validation of the security event and its alert.

15. The non-transitory computer-readable storage medium of claim 14, further comprising:

determining whether intervention is required for said cybertagging based on said type of security event; and performing a known IP test on operators based on said determination.

16. The non-transitory computer-readable storage medium of claim 13, further comprising:

iteratively assess the impact of said security event on each asset in said hierarchy, wherein said iterative impact assessment comprising:

converting each asset's attributes into a Boolean representation and evaluating, in accordance with the cybertagging results, each representation in order to generate a baseline context;

performing real-time sensitivity analysis based on each asset's attributes against a repository of threat data, and developing a risk quantile;

determining event risk based on said sensitivity analysis of each asset;

defining an integral based on fluctuations of said event risk; and generating a probability of validity of the security event based on said integral, said generation comprising assigning the probability to said security event.

17. The non-transitory computer-readable storage medium of claim 16, further comprising:

create an auditable record, said record comprising each calculation and triggered action captured and stored for said iterative assessment.

18. The non-transitory computer-readable storage medium of claim 16, further comprising:

determining said risk assessment (R), said determination comprising a calculation comprising:

$$\Sigma(((b*c)+(t*tv))/s)*1/d,$$

wherein b=business criticality rating;

wherein c=capital value index;

wherein s=security control ratio (Index value relating to the number of applicable NIST SP 800-53 controls vs. number of controls successfully implemented);

wherein t=threat, vulnerability and probability (index value relating to the nature of the threat(s), severity of the threat(s), known vulnerabilities and probability of compromise);

wherein tv=template value (each element is assigned a risk template with default questions that are answered with digital cybertagging testing—the questions represent residual risk such as ownership, training, and the like, and can be customized; and wherein d=level (separation degree from primary element affected by event).

19. The non-transitory computer-readable storage medium of claim 12, further comprising:

calculating, based on said determined impact value for each asset in said hierarchy, an impact assessment, said impact assessment determination comprising a calculation comprising:

$$\Sigma((b*s)/n)*p,$$

wherein b=Business Process Criticality Ratings;

wherein s=Sum of real-time activity risk measurements;

wherein n=Number of dependent business processes; and wherein p=Probability of failure (probability distribution based on sum of risk measurements).

20. A computing device comprising:

a processor;

a non-transitory computer-readable storage medium for tangibly storing thereon program logic for execution by the processor, the program logic comprising:

logic executed by the processor for receiving, at the computing device, an alert notification indicating a security event with at least one component of a computerized network, said computerized network comprising a plurality of nodes associated with devices and networked services available to such devices;

logic executed by the processor for analyzing, via the computing device, said alert notification by parsing the data associated with said alert, and based on said parsing, identifying event data related to said security event, said event data providing an indication of a location within the network where said alert originated and a type of security event that triggered said alert;

logic executed by the processor for retrieving, via the computing device from an asset database associated with the computing device, information associated with assets related to said event data, said retrieving comprising searching said asset database, identifying assets related to said event data and performing said retrieval of said information for said identified assets;

logic executed by the processor for creating, via the computing device, a hierarchy of related elements based on the event data and the retrieved asset information, said element hierarchy comprising an ontology of the security event and the identified assets, said ontology structured such that relationships between the security event, the assets and their respective information is retrievable from the hierarchy;

logic executed by the processor for executing, via the computing device, cybertagging testing on the created hierarchy of elements, said cybertagging testing comprising cybertagging the security event by determining, via analysis of the hierarchy of elements in view of cybertagging tests associated with asset and network controls, a validation indication of the security event, a risk assessment and incident categorization of the security event are determined;

logic executed by the processor for determining, via the computing device based on results of said cybertagging, a value representing an impact of the security event on each of the assets identified in said element hierarchy;

logic executed by the processor for determining, via the computing device, an impact model indicating how the security event has impacted the computerized network based on said determined values of impact, said impact model comprising identification of vulnerabilities on the network and their associated mitigation strategies; and logic executed by the processor for generating and communicating, via the computing device, a user interface (UI) that displays information related to the impact model, said communication of the UI enabling a node on said network to execute at least one of the mitigation strategies in order to thwart a future security event related to said security event.

* * * * *